United States Patent Office 3,689,360
Patented Sept. 5, 1972

3,689,360
PROCESS FOR PRODUCING δ-(N-ACETYL)-L-ORNITHINE
Yuichi Noguchi, Junichi Nakajima, and Kazumi Araki, Hofu-shi, Japan, assignors to Kyowa Hakko Kogyo Co., Ltd., Tokyo, Japan
No Drawing. Continuation of application Ser. No. 604,545, Dec. 27, 1966. This application July 12, 1968, Ser. No. 744,293
Claims priority, application Japan, Dec. 27, 1965, 41/80,095
Int. Cl. C12d 13/06
U.S. Cl. 195—29         8 Claims

ABSTRACT OF THE DISCLOSURE

The present disclosure is directed to a fermentation process for the production of δ-(N-acetyl)-L-ornithine. In particular, it has been found that large quantities of δ-(N-acetyl)-L-ornithine are accumulated when microorganisms capable of producing this product and belonging to the genus Paracolobactrum are cultured aerobically in a nutrient medium. Mutant strains thereof which require both citrulline (or arginine) as well as at least one pyrimidine (or precursors thereof) are especially advantageous therefor. An example of such a mutant strain is *Paracolobactrum coliforme* ATCC 21031.

CROSS REFERENCE

This application is a continuation of copending application Ser. No. 604,545, filed on Dec. 27, 1966, now abandoned.

BACKGROUND OF THE INVENTION

δ-(N-acetyl)-L-ornithine has been recognized in the prior art as one of the amino acid constituents of certain specific plants. However, a method for the industrial production thereof has never been successfully effected in practice. This would be a great advantage since δ-(N-acetyl)-L-ornithine is recognized as being useful as a sweetener as well as being a constituent of various foodstuffs, medicines, etc.

Research by the present inventors aimed at the production of amino acids by microorganisms has shown that δ-(N-acetyl)-L-ornithine may be produced and accumulated in culture media containing certain microorganisms and appropriate amounts of carbon sources, nitrogen sources, inorganic compounds and other nutrients, as discussed in detail hereinbelow. It is a novel finding of the present invention that δ-(N-acetyl)-L-ornithine may be produced in a fermentation process with microorganisms in culture media containing carbon sources, nitrogen sources, minerals and other nutrients.

Accordingly, one of the objects of the present invention is to provide a process for the production of δ-(N-acetyl)-L-ornithine on an industrial scale.

Another object of the present invention is to provide a process for producing δ (N-acetyl)-L-ornithine by fermentation which may be carried out in an efficacious and simple manner, overcoming the disadvantages and deficiencies of the prior art methods.

A further object of the invention is to provide a process for producing δ-(N-acetyl)-L-ornithine by fermentation which may be carried out advantageously on an industrial scale at low cost to give a high yield of product.

These and other objects and advantages of the present invention will become apparent to those skilled in the art from a consideration of the following specification and claims.

DESCRIPTION OF THE INVENTION

In accordance with the present invention, it has been found that δ-(N-acetyl)-L-ornithine may be produced by a fermentation process using microorganisms belonging to the genus Paracolobactrum which are capable of producing this compound. In particular, remarkable amounts thereof are obtained by culturing the mutant strains belonging to the genus Paracolobactrum which require both citrulline (which may be substituted for by arginine) and pyrimidines (which may be substituted for by the precursors of pyrimidines) for their growth. By the process of the present invention, it is possible to accumulate a high concentration of δ-(N-acetyl)-L-ornithine in the culture medium, which may then be collected therefrom.

Thus, for the first time, the production of δ-(N-acetyl)-L-ornithine may be carried out on an industrial scale with the consequent economic advantage thereof. Moreover, according to the process of the present invention, racemic compounds are never produced in the culture medium, unlike the synthetic method for the production thereof, and only the L-form of the δ-(N-acetyl)-derivative is produced. Furthermore, it is very easy to recover the desired product from the culture medium since only small amounts of L-ornithine are accumulated in the culture medium as a by-product. Since the accumulated amount of L-ornithine is very small compared with the amount of δ-(N-acetyl)-L-ornithine produced, and also since δ-(N-acetyl)-L-ornithine is a neutral substance, the isolation and recovery of the latter substance may be quite easily effected.

A strain advantageously suitable for carrying out the process of the present invention is the biochemical nutrient-requiring mutant strain *Paracolobactrum coliforme* No. 5017 ATCC 21031. This strain is obtained by the ultraviolet irradiation of the strain *Paracolobactrum coliforme*, the latter species being well known, the bacteriological properties thereof being described in Bergey's "Manual of Determinative Bacteriology," 7th Edition (1957), page 348. *Paracolobactrum coliforme* ATCC 21031 differs from its parent strain in that it requires citrulline (which may also be substituted for by arginine) and pyrimidines (which may also be substituted for by precursors of pyrimidines) for its growth. Thus, the mutant strain is a nutrient defective microorganism of the parent original strain. Table 1 shows the nutrient requirements significant to the differences between the parent and the mutant strain thereof.

TABLE 1

*Paracolobactrum coliforme*

Nutrient nucleic acid and amino-acid requiring property:
  Parent strain—None.
  Mutant strain (No. 5017 ATCC 21031)—Citrulline or arginine and pyrimidines such as uracil, uridine, cytosine, cytidine, or carbamylaspartic acid.

As for the composition of the culture medium to be employed with the Paracolobactrum microorganisms, either a synthetic or a natural culture medium is suitable as long as it contains the essential nutrients for the growth of the microorganism employed. Such nutrients are well known in the art and include substances such as a carbon source, a nitrogen source, inorganic compounds and the like, as well as essential nutrients utilized by the bacterium employed, in appropriate amounts. Thus, as a carbon source, there may be mentioned, by way of example, carbohydrates such as glucose, glycerol, fructose, mannose, galactose, sucrose, maltose, lactose, saccharified starch solution and molasses, as well as other suitable carbon sources. The carbon source may be either one of these substances or a mixture of two or more. As a nitrogen source, various kinds of inorganic or organic salts or compounds such as ammonia, ammonium sulfate, ammonium chloride, ammonium nitrate, ammonium carbonate, ammonium acetate, ammonium phosphate, etc., other suitable nitrates, urea, or other compounds containing nitrogen, such as peptone, bouillon, casein hydrolysates, cornsteep liquor, meat extract, yeast extract, fish meal, distillers soulbles and the like may be employed. The nitrogen source may also be one of those substances or a combination of two or more. Inorganic compounds which may be added to the culture medium include potassium dihydrogen phosphate, potassium monohydrogen phosphate, sodium chloride as well as other water-soluble salts of magnesium, iron, manganese, nickel, molybdenum, zinc, cobalt, copper, chromium, nickel, etc., such as magnesium sulfate, calcium carbonate, manganese sulfate, etc.

It is also necessary to add to the culture medium nutrients such as amino acids and nucleic acids required for the growth of the bacteria used. Such nutrients can be supplied either by using pure materials or by using nutrients containing the same, such as natural organic nitrogen sources. For example, when the above-mentioned *Paracolobactrum coliforme* No. 5017 ATCC 21031 is used, citrulline or arginine as an amino acid nutrient and pyrimidines (uracil, uridine, cytosine, cytidine, etc.) as the nucleic acid nutrient are both added to the culture medium. Arginine can be added to the culture medium in the form of amino acid-containing materials, such as bouillon, peptone, cornsteep liquor, N-Z-Amine (trademark for a series of casein hydrolysates), yeast extract or Mieki (trademark for gluten or soybean meal hydrolysate of which glutamic acid is removed), or as the hydrolysates of proteins, such as casein, fish meal, soybean cakes, chrysalis or fermentation residues. Pyrimidines or the precursors thereof can be added to the culture medium in the form of nucleic acid-containing materials, such as cornsteep liquor, yeast extract or bouillon. Thus, the exemplary materials named herein may be used as the source of, for example, arginine or of the required pyrimidine or precursor thereof.

The fermentation process of the present invention is carried out under aerobic conditions, such as aerobic shaking of the culture or with aeration and agitation of a submerged culture, at a temperature of about 25° to 40° C., preferably 28°–37° C. The pH tends to decrease during culturing, and it is necessary to adjust the pH to within a range of 5.5–8.5 by using proper neutralizing agents at the beginning of culturing or during culturing in order to obtain a high yield of product. Neutralizing agents which may be used for this purpose include alkalis such as aqueous ammonia, sodium hydroxide, potassium hydroxide, etc., or compounds such as ammonium carbonate, calcium carbonate, calcium hydroxide and the like.

Culturing is generally carried out for from 3 to 5 days. During this time, remarkable amounts of δ-(N-acetyl)-L-ornithine are accumulated in the culture liquor.

After the completion of fermentation, the δ-(N-acetyl)-L-ornithine may be separated from the fermentation filtrate by conventional means, such as ion exchange resin treatment, extraction with solvents as well as other various physical and chemical procedures generally applied for the separation and purification of δ-(N-acetyl)-L-ornithine. The ion exchange resin procedure described in the following paragraph may be employed advantageously for the separation and purification of the δ-(N-acetyl)-L-ornithine product.

A cultured solution from which the bacterial cells have been removed is brought into contact with a strongly acidic cation ion exchange resin ($NH_4$ type). This is followed by eluting out the δ-(N-acetyl)-L-ornithine with water, thereby taking advantage of the extremely weak adsorbing property of δ-(N-acetyl)-L-ornithine. Consequently, δ-(N-acetyl)-L-ornithine is removed by the water from the column, while by-product L-ornithine is left adsorbed on the ion exchange resin. As noted above, the δ-(N-acetyl)-L-ornithine-containing solution thus obtained can be subjected to various physical or chemical procedures for further separating and purifying the δ-(N-acetyl)-L-ornithine. For example, the above-mentioned eluent, i.e., the δ-(N-acetyl)-L-ornithine-containing solution, is adjusted to an acid pH, brought into contact with a strongly acidic cation exchange resin (H type) and eluted with aqueous ammonia after having been washed with water. The δ-(N-acetyl)-L-ornithine eluent fractions are combined, condensed under reduced pressure and allowed to cool by standing after the addition of suitable organic solvents thereto, such as alcohols, for example, methanol, ethanol, n-butanol, etc. Crystals of δ-(N-acetyl)-L-ornithine are thereby obtained. The crystals may be further purified, if desired, by recrystallization.

EXAMPLES OF THE INVENTION

The following examples are given merely as illustrative of the present invention and are not to be considered as limiting. Unless otherwise noted, the percentages therein are by weight.

Example 1

*Paracolobactrum coliforme* No. 5017 ATCC 21031 is transplanted into a culture medium consisting of 2% of glucose, 1% of ammonium sulfate, 0.3% of urea, 2% of cornsteep liquor, 400 μg./ml. of uracil and 1% of $CaCO_3$. Culturing is then carried out with aerobic shaking for 24 hours. This is used as the seed culture in the fermentation described below.

Amounts of about 5% of the seed culture are added to individual 250 ml. conical flasks each containing 20 ml. of a culture medium having the following composition (per liter of water):

7% glucose
200 μg./ml. arginine hydrochloride
300 μg./ml. uracil
1.6% ammonium chloride
0.15% $KH_2PO_4$
0.05% $K_2HPO_4$
0.05% $MgSO_4 \cdot 7H_2O$
0.001% $FeSO_4 \cdot 7H_2O$
0.002% $MnSO_4 \cdot 4H_2O$
2% $CaCO_3$ The pH of the fermentation medium is 7.2. The flasks containing the fermentation medium are sterilized prior to the said addition of the seed culture medium thereto.

Culturing is carried out with aerobic shaking of the culture at 28° C. for five days. As a result, the average amount of δ-(N-acetyl)-L-ornithine found to be accumulated in the culture liquor is 4.5 mg./ml. The amount of by-product L-ornithine is 1.3 mg./ml. on the average.

After the completion of culturing, the individual culture liquor solutions from each flask are combined to give a total volume of about 1 liter. The bacterial cells are removed therefrom and the pH thereof is adjusted to 7.0. The resultant bacteria-free solution is poured into an ion exchange resin column packed with 500 ml. of a strongly acidic cation exchange resin (Diaion SK #1, $NH_4$ type), and water is subsequently passed through this column whereby the resultant flow is collected and adjusted to a pH of 3.0. The resultant solution obtained from the column is poured into another ion exchange resin column packed with a strongly acidic cation exchange resin (Diaion SK #1, H type), and the non-adsorbed substances are removed by washing the same with water, while the adsorbed portion is subsequently eluted with 2 N aqueous ammonia.

By dividing the resultant eluent into 50 ml. fractions, combining only the ninhydrin-positive fractions thereof and condensing the latter under reduced pressure, and then adding thereto three times the resultant volume thereof of 98% ethanol to crystallize the δ-(N-acetyl)-L-ornithine, 2.8 grams of crude crystals of δ-(N-acetyl)-L-ornithine is obtained. The crude crystals are dissolved in a small amount of water, decolorized by means of active carbon and then recrystallized. The principal physical and chemical properties of the crystals thus obtained are as follows:

TABLE 2

| [α]$_D^{25}$ (c=1.5 N HCl) | Experimental value +24.8, percent | Literature value +24.0, percent |
|---|---|---|
| Values obtained by elemental analysis: | | |
| C | 47.92 | 48.3 |
| H | 8.05 | 8.0 |
| N | 16.00 | 16.1 |

Moreover, as the result of comparing the paper chromatographic behavior of this substance observed with the solvent systems butanol-acetic acid-water, lutidinecollidine (water-saturated), phenol-water and ethanol-water-urea, $R_f$ values of 0.47, 0.17, 0.84 and 0.65 were observed, respectively. It was recognized that these values are identical to the $R_f$ values for the standard material. Moreover, the infra-red absorption spectrum obtained is also entirely identical to that reported in the literature for δ-(N-acetyl)-L-ornithine. And, L-ornithine and acetic acid were detected from a hydrolysate solution of the resultant crystals obtained by treating them with dilute sulfuric acid.

Thus, substantially pure crystals of δ-(N-acetyl)-L-ornithine may be efficaciously obtained by using a procedure in accordance with the present disclosure.

Example 2

Culturing is carried out in the same manner as described in Example 1, except that the fermentation medium employed has the following composition:

8% glucose
300 μg./ml. uracil
2% ammonium sulfate
0.15% $KH_2PO_4$
0.05% $K_2HPO_4$
0.05% $MgSO_4 \cdot 7H_2O$
2% $CaCO_3$ The pH of the fermentation medium is 7.2.

Table 3 shows the amounts of δ-(N-acetyl)-L-ornithine and L-ornithine, respectively, accumulated by culturing *Paracolobactrum coliforme* ATCC 21031 wherein 0.5% of peptone, 1.0% of cornsteep liquor and 0.7% of bouillon, respectively, is added to the above-mentioned culture medium as the arginine source.

TABLE 3

| Added to culture medium | δ-(N-acetyl)-L-ornithine accumulated, mg./ml. | L-ornithine accumulated, mg./ml. |
|---|---|---|
| Cornsteep liquor (1.0%) | 10.8 | 0.8 |
| Peptone (0.5%) | 12.0 | 0.5 |
| Bouillon (0.7%) | 2.3 | 0.7 |

It can thus be seen that large amounts of δ-(N-acetyl)-L-ornithine may be produced in the manner described, particularly with the use of cornsteep liquor or peptone, with only very small amounts relatively of L-ornithine being formed as a by-product.

Example 3

Culturing is carried out in the same manner as described in Example 1 and with the same microorganism except that the composition of the fermentation medium employed is as follows:

| | Percent |
|---|---|
| Glucose | 14 |
| $KH_2PO_4$ | 0.15 |
| $K_2HPO_4$ | 0.05 |
| $MgSO_4 \cdot 7H_2O$ | 0.05 |
| Ammonium sulfate | 1.7 |
| $CaCO_3$ | 3 |

The pH of the culture medium is 7.2.

The amounts of δ-(N-acetyl)-L-ornithine accumulated in the culture medium, when cultured in the presence of 1.0% cornsteep liquor, 0.75% yeast extract and 1.0% bouillon, respectively, as the source materials for the requisite arginine and pyrimidines, are shown in Table 4.

TABLE 4

| Added to culture medium | δ-(N-acetyl)-L-ornithine accumulated, mg./ml. | L-ornithine accumulated, mg./ml. |
|---|---|---|
| Yeast extract (0.75%) | 4.4 | 0.8 |
| Cornsteep liquor (1.0%) | 5.3 | 0.4 |
| Bouillon (1.0%) | 3.3 | 0.2 |

The invention being thus described, it will be obvious that the same may be varied in many ways. Such variations are not to be regarded as a departure from the spirit and scope of the invention, and all such modifications as would be obvious to one skilled in the art are intended to be included herein.

What is claimed is:

1. A process for producing δ-(N-acetyl)-L-ornithine which comprises culturing the microorganism *Paracolobactrum coliforme* ATCC 21031 in an aqueous nutrient medium under aerobic conditions, accumulating δ-(N-acetyl)-L-ornithine in the resultant culture liquor, and recovering the δ-(N-acetyl)-L-ornithine therefrom.

2. A process for producing δ-(N-acetyl)-L-ornithine which comprises culturing a microorganism capable of producing δ-(N-acetyl)-L-ornithine and belonging to the genus Paracolobactrum, and requiring citrulline or arginine as well as at least one pyrimidine selected from the group consisting of uracil, uridine, cytosine, cytidine and carbamylaspartic acid for its growth, under aerobic conditions in an aqueous nutrient medium containing said growth-requiring substances or materials containing the same, and accumulating δ-(N-acetyl)-L-ornithine in the resultant culture liquor.

3. The process of claim 2, wherein said microorganism is *Paracolobactrum coliforme*.

4. The process of claim 1, wherein culturing is carried out at a temperature of from about 25° to 40° C., and a pH of from about 5.5 to 8.5.

5. The process of claim 1, wherein the δ-(N-acetyl)-L-ornithine is recovered from the resultant culture liquor by an ion exchange resin treatment.

6. The process of claim 2, wherein said microorganism is *Paracolobactrum coliforme* ATCC 21031.

7. The process of claim 6, wherein culturing is carried out at a temperature of from about 25° to 40° C. and a pH of from about 5.5 to 8.5.

8. The process of claim 7, wherein the δ-(N-acetyl)-L-ornithine is recovered from the resultant culture liquor by an ion exchange resin treatment.

References Cited
UNITED STATES PATENTS 3,374,150   3/1968   Noguchi et al. _____ 195—47

LIONEL M. SHAPIRO, Primary Examiner